United States Patent [19]

Gray

[11] Patent Number: 4,603,876
[45] Date of Patent: Aug. 5, 1986

[54] TRAILER CONVERTOR ASSEMBLY

[76] Inventor: Paul E. Gray, 911 Stratford, West Memphis, Ark. 72301

[21] Appl. No.: 688,060

[22] Filed: Dec. 31, 1984

[51] Int. Cl.⁴ .............................................. B62D 53/00
[52] U.S. Cl. ................................ 280/474; 280/411 C; 280/423 A; 280/476 R; 280/DIG. 14
[58] Field of Search ............... 280/474, 476 R, 491 R, 280/491 D, 411 R, 411 C, 423 R, DIG. 14, 423 A, 432

[56] References Cited

U.S. PATENT DOCUMENTS

| 2,815,963 | 12/1957 | Doneff | 280/432 |
| 3,000,652 | 9/1961 | Hawkins | 280/480 |
| 3,421,777 | 1/1969 | Barker | 280/243 A |
| 3,612,575 | 10/1971 | Stewart | 280/474 |
| 3,782,759 | 1/1974 | Thune | 280/432 |
| 3,801,137 | 4/1974 | Zucca | 280/474 |
| 3,815,939 | 6/1974 | Pettay | 280/474 |

FOREIGN PATENT DOCUMENTS

| 619880 | 5/1961 | Italy | 280/474 |
| 1009870 | 4/1983 | U.S.S.R. | 280/491 R |

Primary Examiner—John J. Love
Assistant Examiner—Everett G. Diederiks
Attorney, Agent, or Firm—Walker & McKenzie

[57] ABSTRACT

A pair of strut members are pivotally attached on either side of a dolly used to pivotally couple the front of a trailing trailer to the rear of a leading trailer. The struts are pivotal between an opened or in-use position in which any substantial pivotal movement of the dolly about relative to the leading trailer about a vertical axis is prevented and a closed or out-of-use position in which free pivotal movement of the dolly relative to the leading trailer is allowed.

9 Claims, 11 Drawing Figures

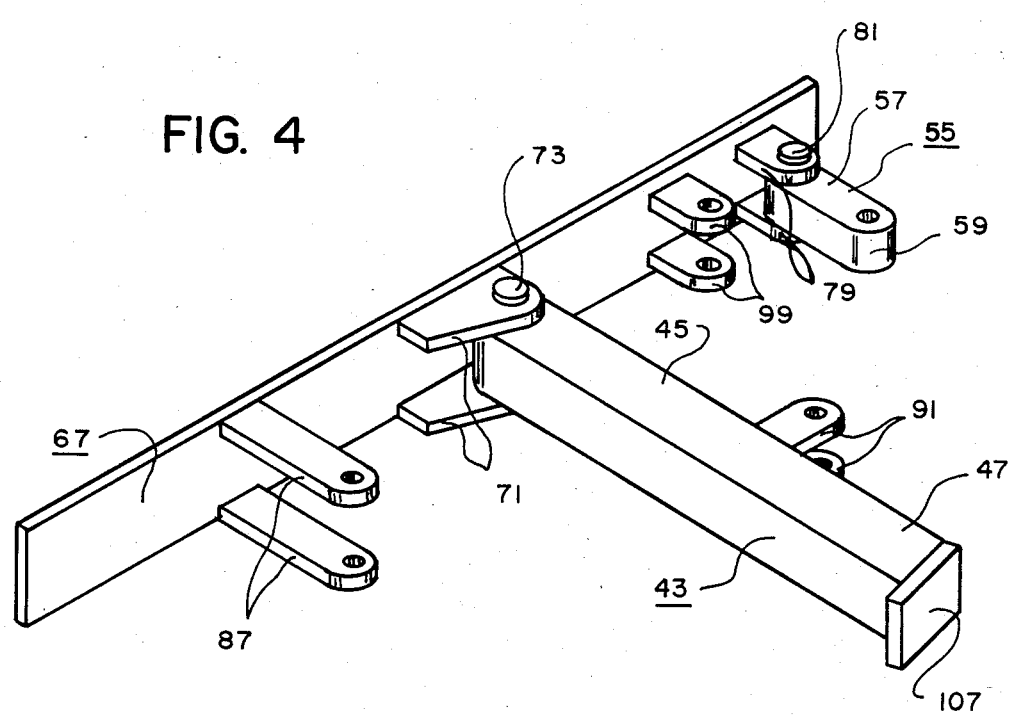
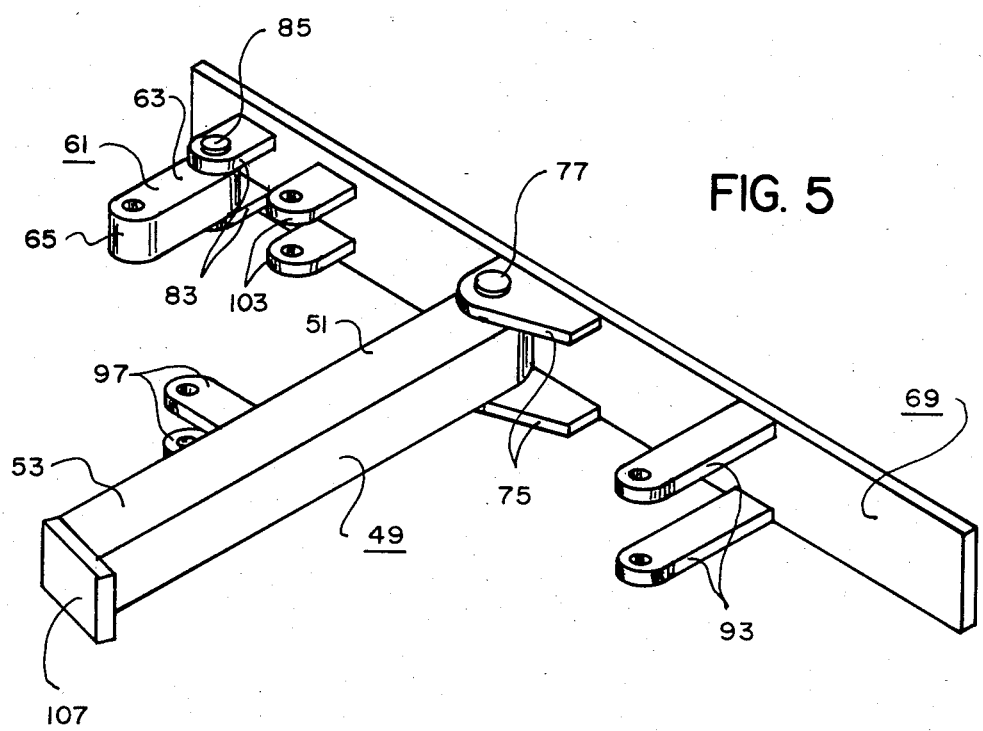

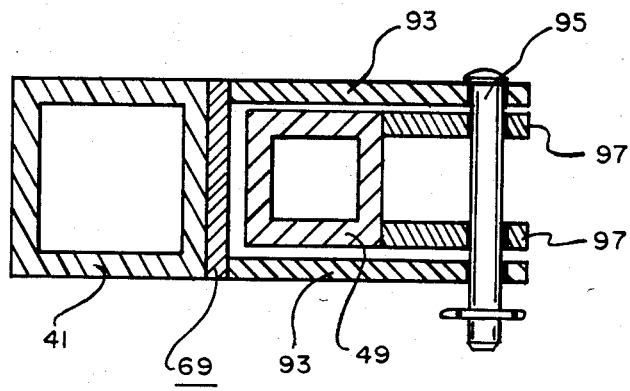
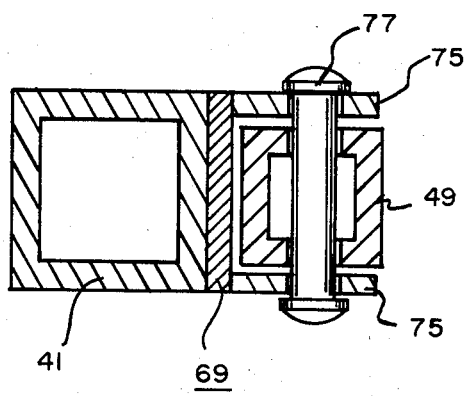
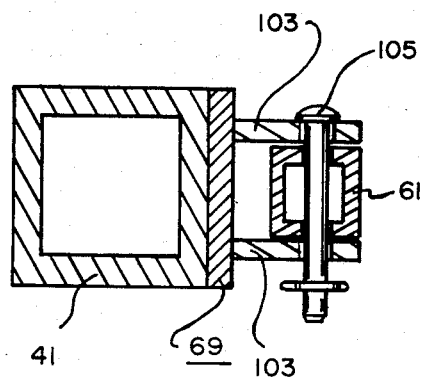
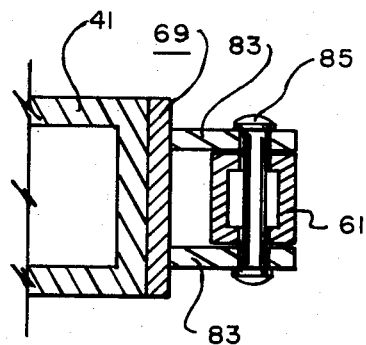
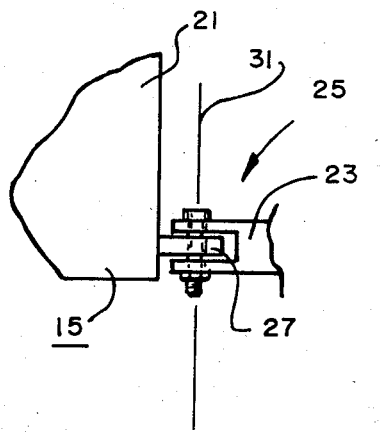

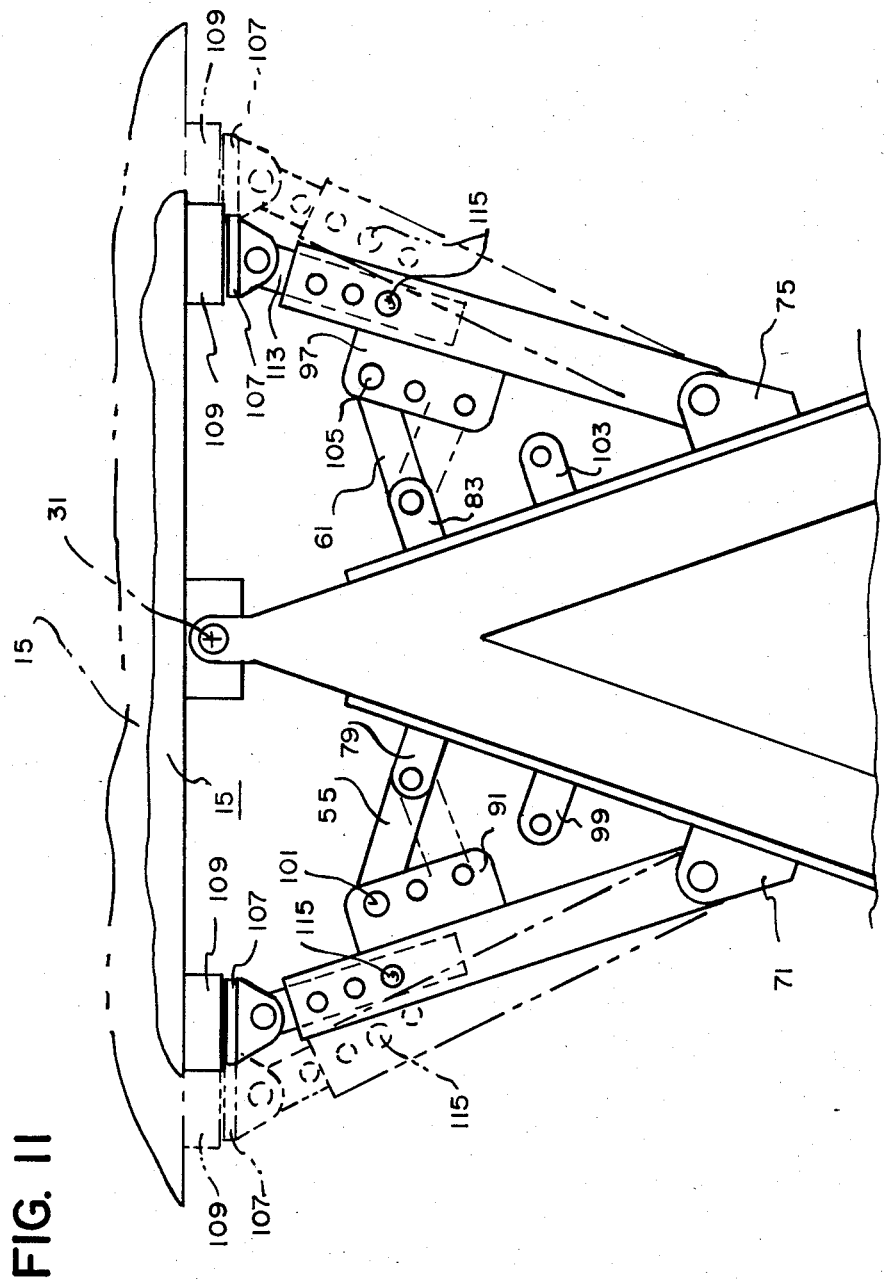

TRAILER CONVERTOR ASSEMBLY

BACKGROUND OF THE INVENTION

1. Field of the Invention

The present invention relates, in general, to means controllably connecting the front of a trailing tractor to the rear of a leading trailer in tandem fashion.

2. Description of the Prior Art

It has become increasingly common to connect two over-the-road type semi-trailers in tandem for being pulled by a single tractor. See, for example, Barker, U.S. Pat. No. 3,421,777; Stewart, U.S. Pat. No. 3,612,575; Morgan, U.S. Pat. No. 3,663,039; Zucca, U.S. Pat. No. 3,801,137; Pettay, U.S. Pat. No. 3,815,939. None of the above patents disclose or suggest the present invention.

SUMMARY OF THE INVENTION

The present invention is directed toward providing an improved convertor assembly for connecting the front of a trailing trailer to the rear of a leading trailer. The concept of the present invention is to pivotally attach a pair of elongated struts to a typical convertor or dolly for movement between first or in-use position in which the convertor will be held substantially in-line behind the leading trailer to allow the convertor to be easily backed up while fastened to the leading trailer, thus allowing the driver to use the tractor to hook and unhook the convertor under the trailing trailer without unhooking the convertor from the leading trailer, and second or out-of-use positions in which the convertor is free to pivot relative to the leading trailer.

The trailer convertor assembly of the present invention comprises, in general, a dolly or convertor including a body member having a forwardly projecting tongue pivotally attached to the rear of a leading trailer for allowing the dolly to pivot about a generally vertical axis and having a hitch pivotally attached to the front of a trailing trailer, and including wheel means for rollably supporting the dolly; an elongated first strut member having a first end pivotally attached to the body member of the dolly on one side of the vertical axis, the first strut member being movable between a first position in which the second end thereof is located remote from the rear of the leading trailer to allow free pivotal movement of the dolly about the vertical axis and a second position in which the second end thereof is located adjacent the rear of the leading trailer to limit pivotal movement of the dolly about the vertical axis; and an elongated second strut member having a first end pivotally attached to the body member of the dolly on the other side of the vertical axis from the first strut member, the second strut member being movable between a first position in which the second end thereof is located remote from the rear of the leading trailer to allow free pivotal movement of the dolly about the vertical axis and a second position in which the second end thereof is located adjacent the rear of the leading trailer to limit pivotal movement of the dolly about the vertical axis.

BRIEF DESCRIPTION OF THE DRAWINGS

FIG. 4 is a perspective view of one unit of the convertor assembly.

FIG. 5 is a perspective view of another unit of the convertor assembly.

FIG. 6 is an enlarged sectional view substantially as taken on line VI—VI of FIG. 3.

FIG. 7 is an enlarged sectional view substantially as taken on line VII—VII of FIG. 3.

FIG. 8 is an enlarged sectional view substantially as taken on line VIII—VIII of FIG. 3.

FIG. 9 is an enlarged sectional view substantially as taken on line IX—IX of FIG. 3.

FIG. 10 is a somewhat diagrammatic view substantially as taken on line X—X of FIG. 2.

FIG. 11 is a top plan view similar to FIG. 2 but showing an alternate construction of portions of the convertor assembly of the present invention.

DESCRIPTION OF THE PREFERRED EMBODIMENT

Figure 1:
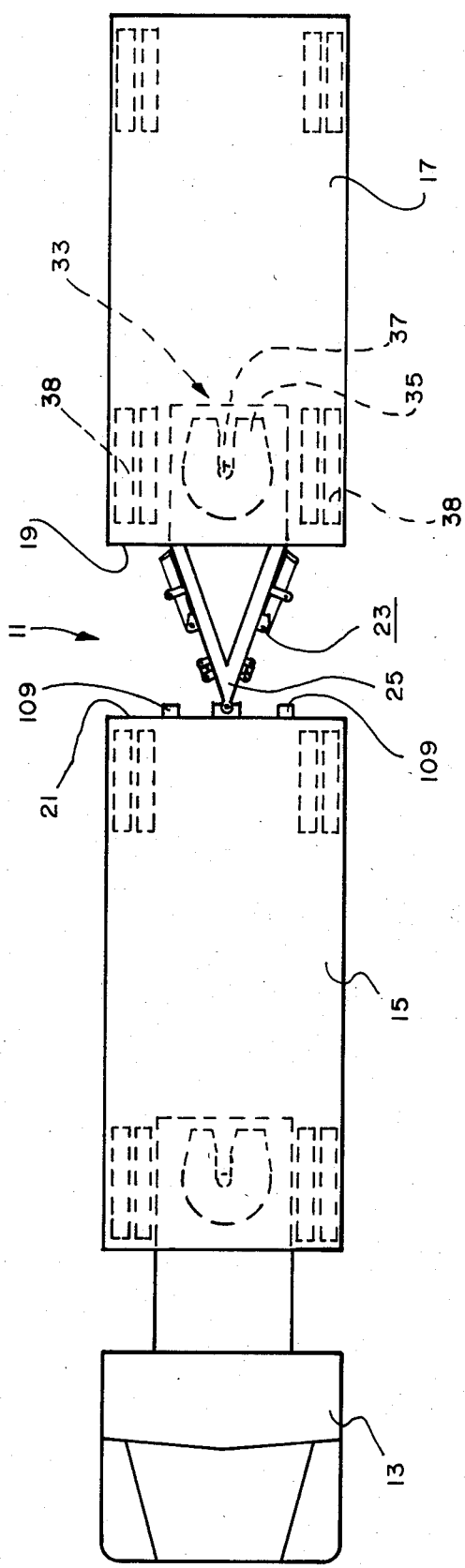
FIG. 1 is a top plan view of a tandem-trailer system including the convertor assembly of the present invention.

The trailer convertor assembly 11 of the present invention is for use in conjunction with a typical tandem-trailer system of the type including an over-the-road type tractor 13, a leading trailer 15 pivotally attached to the tractor 13 and a trailing trailer 17 (see, in general, FIG. 1). More specifically, the assembly 11 is used to connect the front 19 of the trailing trailer 17 to the rear 21 of the leading trailer 15.

The assembly 11 includes a substantially typical convertor or dolly 23 including a body member 24 having a forwardly projecting tongue 25 for being pivotally attached to the rear 21 of the leading trailer 15. More specifically, the rear 21 of the leading trailer 15 may be provided with a draft hook 27, or the like, and the tongue 25 of the dolly 23 may have a draft eye 29 for coacting with the draft hook 27 to thereby pivotally attach the dolly 23 to the rear 21 of the leading trailer 15. The specific construction and operation of the draft hook 27 and draft eye 29 will be apparent to those skilled in the art. Thus, the dolly 21 is allowed to pivot about a generally vertical axis 31 generally located at the center of the rear 21 of the leading trailer 15 (see, in general, FIGS. 2, 3 and 10). The dolly 23 also includes a hitch means 33 for allowing the front 19 of the trailing trailer 17 to be pivotally attached thereto. The hitch means 33 may be of any typical construction, such as the conventional fifth wheel structure 35 adapted to releaseably and pivotally secure a conventional fifth wheel pin 37 attached adjacent the front 19 of the trailing trailer 17 as will now be apparent to those skilled in the art (see FIG. 1). The dolly 23 also includes wheel means 38 for rollably supporting the body member 24, etc. The tongue 25 of the body member 24 preferably includes a first side member 39 and a second side member 41 fixedly attached to one another at one end to define the forward end of the tongue 25 and diverging outwardly from one another toward the rear of the body member 24, thus defining an A-frame structure with the draft eye 29 located substantially at the apex thereof (see, in general, FIGS. 2 and 3). The side members 39, 41 may be constructed out of metal tubing having a substantially square cross-sectional shape (see, e.g., FIGS. 6–8), may be constructed out of typical metal I-beams, etc.

Figure 2:
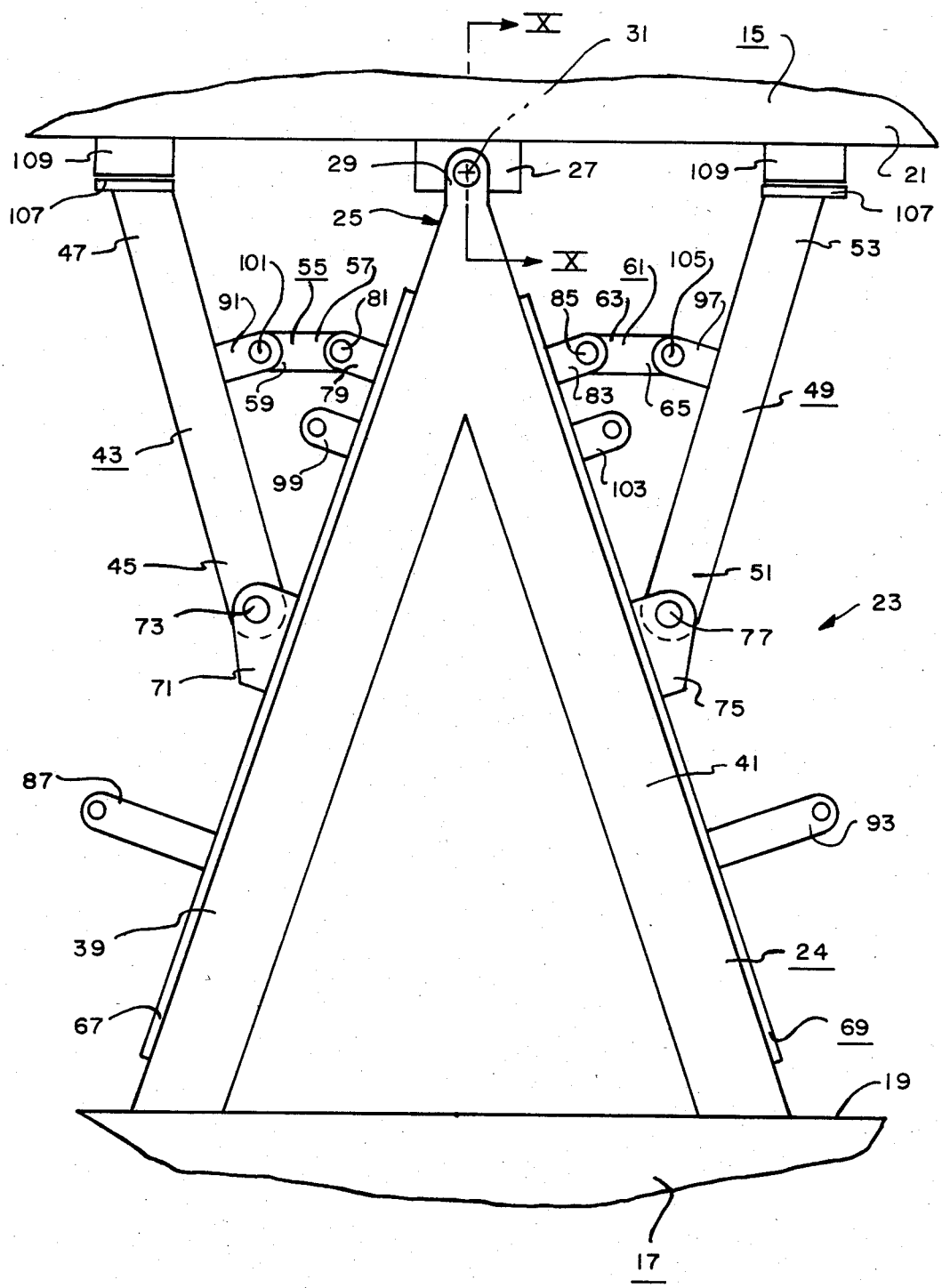
FIG. 2 is an enlarged top plan view of a portion of FIG. 1 showing the convertor assembly in an opened position.
Figure 3:
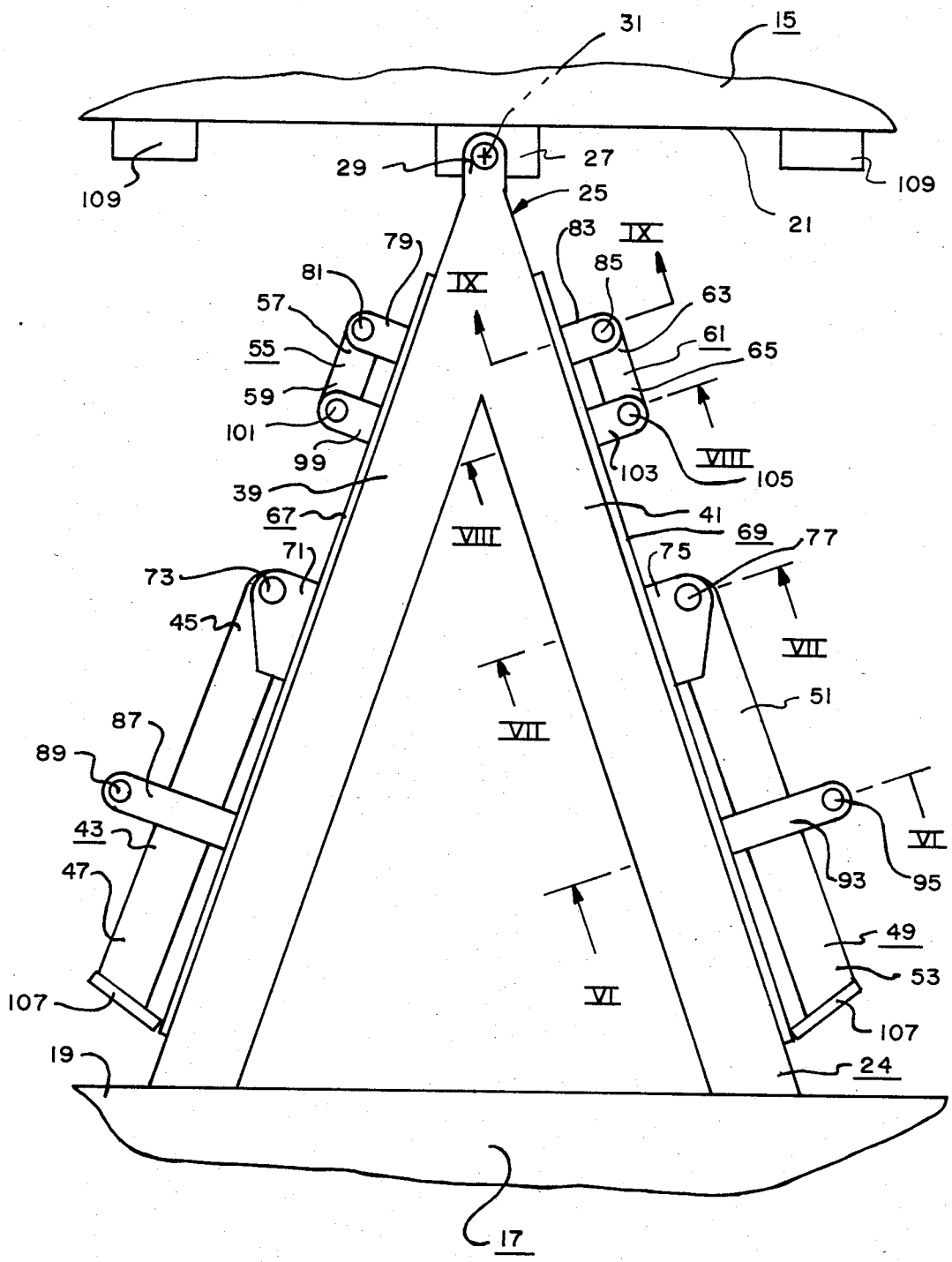
FIG. 3 is a top plan view similar to FIG. 2 but showing the convertor assembly in a closed position.

The assembly 11 includes an elongated front strut member 43 having a first end 45 for being pivotally attached relative to the body member 24 of the dolly 23 on one side of the vertical axis 31 and having a second end 47. The assembly 11 also includes an elongated second strut member 49 having a first end 51 for being pivotally attached to the body member 24 of the dolly 23 on the other side of the vertical axis 31 from the first strut member 49 and having a second end 53. The first and second strut members 43, 49 are movable between a closed or first position in which the second ends 45, 53 thereof are located remote from the rear 21 of the leading trailer 15, as shown in FIGS. 1 and 3, so as not to hinder the free pivotal movement of the dolly 23 about the vertical axis 31 and an opened or second position in which the second ends 47, 53 thereof are located substantially adjacent the rear 21 of the leading trailer 15, as shown in FIG. 2, to limit the pivotal movement of the dolly 23 about the vertical axis 31.

The assembly 11 preferably includes a first brace member 55 having a first end 57 for being pivotally attached to the body member 24 of the dolly and having a second end 59 for being attached to the first strut member 43 when the first strut member 43 is in the second position. The assembly 11 also preferably includes a second brace member 61 having a first end 63 for being pivotally attached to the body member 24 of the dolly 23 and having a second end 65 for being attached to the second strut member 49 when the second strut member 49 is in the second position. The first and second brace members 55, 61 are movable between a first position in which the second ends 59, 65 thereof are not attached and do not touch the respective strut members 43, 49 as shown in FIGS. 1 and 3 and a second position in which the second ends 59, 65 thereof engage and are attached to the respective strut members 43, 49 as shown in FIG. 2.

The assembly 11 includes an elongated first base member 67 for being fixedly attached to the body member 24 of the dolly 23 on one side of the vertical axis 31. The assembly 11 also preferably includes an elongated second base member 69 for being fixedly attached to the body member 24 of the dolly 23 on the other side of the vertical axis 31 from the first base member 67. The first and second base members 67, 69 preferably consist of elongated metal plates for being bolted, welded or otherwise fixedly attached to the first and second side members 39, 41 respectively of the body member 24 of the dolly 23.

The first base member 67 preferably includes a first set of ear members 71 attached thereto with the first end 45 of the first strut member 43 being pivotally attached thereto by a first strut pivot pin 73 (see, in general, FIG. 4). The second base member 69 also preferably includes a first set of ear members 75 attached thereto with the first end 51 of the second strut member 49 pivotally attached thereto by way of a second strut pivot pin 77 (see, in general, FIG. 5).

The first base member 67 preferably has a second set of ear members 79 fixedly attached thereto with the first end 57 of the first brace member 55 pivotally attached thereto by way of a first brace pivot pin 81 (see, in general, FIG. 4). The second base member 69 also preferably includes a second set of ear members 83 attached thereto with the first end 63 of the second brace member 61 pivotally attached thereto by way of a second brace pivot pin 85.

The first base member 67 preferably includes a third set of ear members 87 attached thereto (see, in general, FIG. 4) for coacting with the first strut member 43 to fixedly hold the first strut member 43 in the first position with the aid of a removable pin member 89 (see, in general, FIG. 3). The first strut member 43 may include a set of ear members 91 (see, in general, FIG. 4) and adapted to allow the removable pin member 89 to be inserted through the third set of ear members 87 and the set of ear members 91 when the first strut member 43 is in the first position (see, in general, FIG. 3) to thereby fixedly hold the first strut member 43 in the first position. The second base member 69 also preferably includes a third set of ear members 93 attached thereto (see, in general, FIG. 5) for coacting with a removable pin member 95 to fixedly hold the second strut member 49 in the first position (see, in general, FIG. 3). The second strut member 49 may have a set of ear members 97 attached thereto (see, in general, FIG. 5) and adapted to allow the removable pin member 95 to be inserted through the third set of ear members 93 and the set of ear members 97 when the second strut member 49 is in the first position to fixedly hold the second strut member 49 in the first position (see, in general, FIG. 3).

The first base member 67 may include a fourth set of ear members 99 attached thereto (see, in general, FIG. 4) for coacting with a removable pin member 101 to hold the first brace member 55 in the first position (see, in general, FIG. 3). Thus, the first brace member 55 and the fourth set of ear members 99 preferably have apertures therethrough to allow the removable pin member 101 to be inserted therethrough when the first brace member 55 is in the first position to thereby fixedly hold the first brace member 55 in the first position. The second base member 69 also preferably has a fourth set of ear members 103 attached thereto (see, in general, FIG. 5) for coacting with a removable pin member 105 to fixedly hold the second brace member 61 in the first position (see, in general, FIG. 3). Thus, the second brace member 61 and the fourth set of ear members 103 preferably have apertures therethrough for allowing the removable pin member 105 to be inserted therethrough when the second brace member 61 is in the first position to thereby fixedly hold the second brace member 61 in the first position.

The second ends 47, 53 of the first and second strut members 43, 49 may be provided with a plate-like bumper 107 for selective engagement with the rear 21 of the leading trailer 15 (see, in general, FIG. 2). The rear 21 of the leading trailer 15 is preferably provided with a pair of conventional, laterally-spaced bumpers 109 (see, in general, FIGS. 1 and 2), and the assembly 11 is arranged so that the second ends 47, 53 (and, more specifically, the bumpers 107) of the first and second strut members 43, 49 will substantially engage the bumpers 109 when the first and second strut members 43, 49 are in the second position, thereby substantially preventing the dolly 23 from pivoting about the vertical axis 31.

The various ear members are preferably constructed of metal plates and may be fixedly attached to the respective base or strut members by being welded thereto or the like. The bodies of the various strut and brace members are preferably constructed of metal tubing having a substantially square cross-section.

The removable pin members 89, 95, 101, 105 may be of various specific construction well-known to those skilled in the art, such as a standard clevis pin and may be provided with a standard hitch pin to prevent the unintentional or accidental removal thereof. Further, the removable pin members may be attached to other components of the assembly 11 by way of an elongated length of flexible chain or the like (not shown) to prevent the accidental loss thereof.

To use the present invention, the first step is to fixedly attach the base members 67, 69 to the sides 39, 41 of the body 24 of any conventional dolly 23 in a position so that the bumpers 107 at the second ends 47, 53 of each strut member 43, 49 will substantially engage the bumpers 109 at the rear 21 of the leading trailer 15 when the strut members 43, 49 are in the second position. The units are preferably adjusted so that there is at least a small amount of tolerance or clearance between the bumpers 107 and the bumpers 109 when the strut members 43, 49 are in the second position to thereby allow some limited pivotal movement of the dolly 23 about the vertical axis 31. The strut members 43, 49 can then be easily moved between the first and second positions in a manner as will now be apparent to those skilled in the art. Thus, for example, if the strut members 43, 49 and brace members 55, 61 are in the second positions with the strut members 43, 49 fixedly attached to the ear members 87, 93 by the removable pin members 89, 95 and with the brace members 55, 61 fixedly attached to the ear members 99, 103 by way of the removable pin members 101, 105, as shown in FIG. 2, the mere removal of the various removable pin members will allow the strut members 43, 49 and brace members 55, 61 to be manually pivoted to the respective first positions. The removable pin members 101, 105 can then be used to fixedly attach the second ends 59, 65 of the first and second brace members 55, 61 to the first and second strut members 43, 47 respectively by passing the respective pin members 101, 105 through apertures in the respective ear members 91, 97 and through the apertures through the second ends, 59, 65 of the first and second brace members 55, 61, as shown in FIG. 3.

An alternate construction of certain portions of the assembly 11 is shown in FIG. 11. This alternate construction allows the assembly 11 to be adjusted for use with trailers of varying widths. Thus, in FIG. 11, the first and second strut members 43, 49 are made adjustable in length and the first and second brace members 55, 61 are coupled to the first and second strut members 43, 49 in such a manner to allow the effective distance between the bumpers 107 to be varied. More specifically, the first and second strut members 43, 49 may each be provided with a telescoping insert 113 to which the bumper 107 is pivotally attached. The inserts 113 are fixedly attached to the main body of each strut member 43, 49 by way of a pin 115 which extends through one set of plurality of spaced apart transverse apertures in each component, thus allowing the effective length of each strut member to be varied. The ear members 91, 97 may also be provided with a plurality of spaced apart apertures for receiving the pin members 101, 105 to thus allow the angle between the strut members 43, 49 and the brace members 55, 61 to be varied thereby allowing the assembly 11 to be used with a wider leading trailer 15 as shown in broken lines in FIG. 11.

Although the present invention has been described and illustrated with respect to a preferred embodiment thereof and a preferred use therefore, it is not to be so limited since changes and modifications may be made therein which are within the full intended scope of the invention.

I claim:

1. A trailer convertor assembly for connecting the front of a trailing trailer to the rear of a leading trailer, the leading trailer including spaced-apart first and second bumpers on the rear thereof, said assembly comprising:
    (a) a dolly including a body member having a forwardly projecting tongue for being pivotally attached to the rear of the leading trailer for allowing said dolly to pivot about a generally vertical axis and having a hitch for being pivotally attached to the front of the trailing trailer, and including wheel means for rollably supporting said body member;
    (b) an elongated first strut member having a first end pivotally attached to said body member of said dolly on one side of said vertical axis and having a second end, said first strut member being movable between a first position in which said second end thereof is located remote from the rear of the leading trailer so as not to hinder free pivotal movement of said dolly about said vertical axis and a second position in which said second end thereof is located so as to engage the first bumper of the leading trailer to limit pivotal movement of said dolly about said vertical axis while providing at least a small amount of clearance between the first bumper and said second end of said first strut member when the leading trailer is substantially directly in front of the trailing trailer;
    (c) an elongated second strut member having a first end pivotally attached to said body member of said dolly on the other side of said vertical axis from said first strut member and having a second end, said second strut member being movable between a first position in which said second end thereof is located remote from the rear of the leading trailer so as not to hinder free pivotal movement of said dolly about said vertical axis and a second position in which said second end thereof is located so as to engage the second bumper of the leading trailer to limit the pivotal movement of said dolly about said vertical axis while providing at least a small amount of clearance between the second bumper and said second end of said second strut member when the leading trailer is substantially directly in front of the trailing trailer;
    (d) a first brace member having a first end pivotally attached to said body member of said dolly and having a second end attached to said first strut member at a point between said first and second ends of said first strut member when said first strut member is in said second position;
    (e) a second brace member having a first end pivotally attached to said body member of said dolly and having a second end attached to said second strut member at a point between said first and second ends of said second strut member when said second strut member is in said second position; and
    (f) adjustment means for allowing the distance between said second ends of said first and second strut members to be varied for allowing said assembly to be used with leading trailers having bumpers on the rear thereof spaced apart varying distances.

2. The assembly of claim 1 in which is included a first base member fixedly attached to said body member of said dolly on one side of said vertical axis; in which is included a first strut pivot pin for pivotally attaching said first end of said first strut member to said first base member; in which is included a second base member fixedly attached to said body member of said dolly on the other side of said vertical axis; in which is included a second strut pivot pin for pivotally attaching said first end of said second strut member to said second base member; in which said first base member has a first set of ear members attached thereto, said first end of said first strut member being pivotally attached to said first set of ear members of said first base member by said first strut pivot pin; and in which said second base member has a first set of ear members attached thereto, said first end of said second strut member being pivotally attached to said first set of ear members of said second base member by said second strut pivot pin.

3. The assembly of claim 2 in which is included a first brace pivot pin for pivotally attaching said first end of said first brace member to said first base member; in which is included a second brace pivot pin for pivotally attaching said first end of said second brace member to said second base member; in which said first base member has a second set of ear members attached thereto, said first end of said first brace member being pivotally attached to said second set of ear members of said first base member by said first brace pivot pin; and in which said second base member has a second set of ear members attached thereto, said first end of said second brace member being pivotally attached to said second set of ear members of said second base member by said second brace pivot pin.

4. The assembly of claim 3 in which is included a removable pin member for attaching said second end of said first brace member to said first strut member in said second position; in which is included a removable pin member for attaching said second end of said second brace member to said second strut member in said second position; in which said first strut member includes a set of ear members attached thereto, said second end of said first brace member being attached to said set of ear members of said first strut member by said removable pin member; and in which said second strut member includes a set of ear members attached thereto, said second end of said second brace member being attached to said set of ear members of said second strut member by said removable pin member.

5. The assembly of claim 4 in which is included a removable pin member for mounting said first strut member to said first base member in said first position; in which is included a removable pin member for mounting said second strut member to said second base member in said first position; in which first base member has a third set of ear members attached thereto, said first strut member being secured to said third set of ear members of said first base member by said removable pin member; and in which said second base member has a third set of ear members attached thereto, said second strut member being secured to said third set of ear members of said second base member by said removable pin member.

6. The assembly of claim 4 in which said set of ear members attached to said first strut member has a plurality of spaced apart apertures therethrough for selectively receiving said removable pin member and for allowing the angle between said first strut member and said first brace member to be varied and for defining in part said adjustment means, and in which said set of ear members attached to said second strut member has a plurality of spaced apart apertures therethrough for selectively receiving said removable pin member and for allowing the angle between said second strut member and said second brace member to be varied and for defining in part said adjustment means.

7. The assembly of claim 1 in which the length of said first and second strut members are adjustable.

8. The assembly of claim 1 in which said adjustment means includes means for allowing the angle between said first strut member and said first brace member to be varied and means for allowing the angle between said second strut member and said second brace member to be varied.

9. The assembly of claim 7 in which said adjustment means includes means for attaching said second end of said first brace member to said first strut member at one of a plurality of spaced-apart points between said first and second ends of said first strut member for allowing the angle between said first strut member and said first brace member to be varied and means for attaching said second end of said second brace member to said second strut member at one of a plurality of spaced-apart points between said first and second ends of said second strut member for allowing the angle between said second strut member and said second brace member to be varied.

* * * * *